United States Patent [19]

Schlisio et al.

[11] Patent Number: 4,485,710

[45] Date of Patent: Dec. 4, 1984

[54] APPARATUS FOR SEVERING RUNNING WEBS OF TIPPING PAPER OR THE LIKE

[75] Inventors: Siegfried Schlisio, Geesthacht; Karl-Heinz Schlüter, Hamburg, both of Fed. Rep. of Germany

[73] Assignee: Hauni-Werke Körber & Co. KG, Hamburg, Fed. Rep. of Germany

[21] Appl. No.: 385,257

[22] Filed: Jun. 4, 1982

[30] Foreign Application Priority Data

Jun. 5, 1981 [DE] Fed. Rep. of Germany ....... 3122310

[51] Int. Cl.[3] ........................ B23D 25/00; B23D 19/06

[52] U.S. Cl. ........................................ 83/346; 83/100; 83/343; 83/344; 83/677; 83/699; 83/700

[58] Field of Search ................. 83/100, 343, 344, 346, 83/348, 674, 677, 698, 699, 700, 345, 347; 144/230; 407/8, 9

[56] References Cited

U.S. PATENT DOCUMENTS

| | | | |
|---|---|---|---|
| 2,429,944 | 10/1947 | Rayburn et al. | 83/346 X |
| 2,660,242 | 11/1953 | Lane | 83/677 X |
| 3,644,109 | 2/1972 | Kunk et al. | 83/674 X |
| 3,863,537 | 2/1975 | Huelsman | 83/699 X |
| 4,240,313 | 12/1980 | Gillespie | 83/677 X |
| 4,366,737 | 1/1983 | Bedford | 83/348 X |
| 4,370,908 | 2/1983 | DeAlto et al. | 83/348 |

FOREIGN PATENT DOCUMENTS

| | | | |
|---|---|---|---|
| 1154612 | 9/1963 | Fed. Rep. of Germany | 144/230 X |
| 1252937 | 12/1960 | France | 83/348 |
| 1805074 | 5/1970 | German Democratic Rep. | |
| 931814 | 7/1963 | United Kingdom | 83/348 |

*Primary Examiner*—Paul A. Bell
*Assistant Examiner*—Taylor J. Ross
*Attorney, Agent, or Firm*—Peter K. Kontler

[57] ABSTRACT

Apparatus for severing the running web of tipping paper in a filter tipping machine has a rotary anvil whose cylindrical peripheral surface is contacted by the running web, a rotary carrier which is adjacent to and defines with the anvil a nip for the running web, a knife which is movably mounted in the carrier and has an elongated cutting edge which cooperates with the web-contacting portion of the peripheral surface of the anvil to sever the web once during each revolution of the carrier, and a system of springs which bias the knife axially of the carrier so as to prevent movements of the knife under the action of centrifugal force and/or gravity but to allow the knife to move its cutting edge into a position in which the entire cutting edge contacts the peripheral surface of the anvil upon completion of the first cut. This reduces noise which is generated when the apparatus is in use. The springs can bear directly against the knife and/or carrier, or they may stress suitable slide blocks which frictionally engage the end portions of the knife or the adjacent sections of the carrier. Noise can be reduced still further by the provision of resilient elements and bearings which prevent radial and/or axial wobbling of the shafts for the anvil and knife carrier with respect to the housing of the tipping machine.

19 Claims, 5 Drawing Figures

APPARATUS FOR SEVERING RUNNING WEBS OF TIPPING PAPER OR THE LIKE

BACKGROUND OF THE INVENTION

The present invention relates to apparatus for severing running webs, sheets, strips or tapes (hereinafter called webs) of paper, foil or like flexible material, especially for severing webs of wrapping material which is used in the manufacture and/or processing of cigarettes, cigars, cigarillos or other smokers' products. More particularly, the invention relates to improvements in severing apparatus of the type wherein a running web is caused to pass through the nip of a rotary anvil and a rotary carrier for one or more knives each of which severs the web once during each revolution of the carrier. Typical examples of such severing apparatus are those which are used in filter tipping machines to convert continuous webs of cigarette paper, imitation cork or like strip-shaped material into series of discrete uniting bands which are used to connect filter plugs with plain cigarettes, cigars or cigarillos in order to form filter cigarettes, cigars or cigarillos of unit length or multiple unit length.

Commonly owned U.S. Pat. No. 4,280,187 granted July 21, 1981 to Reuland et al. describes and shows a filter tipping machine of the type known as MAX S. The machine (shown in FIG. 2 of the patent to Reuland et al.) serves to assemble filter plugs of double unit length with pairs of plain cigarettes of unit length in order to form filter cigarettes of double unit length. To this end, groups of coaxial rod-shaped articles (each such group includes two plain cigarettes of unit length and a filter plug of double unit length therebetween) are advanced sideways and are connected with discrete uniting bands which are obtained by repeatedly severing a continuously running web of cigarette paper, imitation cork or the like. The web is drawn off a reel, and one of its sides is coated with a suitable adhesive ahead of the severing station where the web advances through the nip of a rotary cylindrical anvil and a carrier of several equidistant knives. The web overlies a portion of the peripheral surface of the anvil and is severed whenever a knife on the carrier reaches the nip. The uniting bands are thereupon convoluted around the respective groups so that each thereof forms a tube around the corresponding filter plug as well as around the inner end portions of the associated plain cigarettes. The resulting filter cigarettes of double unit length are thereupon severed midway across the filter plugs so that each thereof yields a pair of filter cigarettes of unit length, one filter cigarette of each pair is inverted end-for-end so that all of the filter cigarettes of unit length form a single row wherein the cigarettes advance sideways and all of the filter plugs face in the same direction, the cigarettes of the single row are tested for integrity or lack of integrity of their wrappers and/or other characteristics, and the satisfactory cigarettes are transported to storage or directly to a packing machine. The disclosure of the patent to Reuland et al. is incorporated herein by reference.

As a rule, the knives on the aforementioned carrier are mounted in such a way that their cutting edges extend in substantial parallelism with the axis of the carrier and that each thereof is tiltable about an axis which is normal to and spaced apart from the carrier axis. This enables the cutting edges to assume optimum positions with reference to the peripheral surface of the anvil, i.e., the cutting edges can sever the web all the way from the one to the other edge. In many instances, the knives are installed in axially parallel radially extending grooves which are machined into the periphery of the carrier, and the knives are tiltable about suitable fulcra in such grooves. In order to ensure that each knife will sever the running web all the way between the two edges of the web, i.e., that each knife will separate from the leader of the web a discrete uniting band, the radius of the ideal cylinder which is described by the cutting edges of the knives slightly exceeds the distance between the axis of the carrier and the peripheral surface of the anvil. In other words, the cutting edges of the knives strike against the peripheral surface of the anvil during the making of each and every cut. The force of impact is not entirely uniform because this parameter depends on a variety of factors such as the distances between the fulcra and the axis of the anvil, the extent of wear upon the knives, the extent of radial wobbling of the carrier and/or anvil, and/or others. The tiltability of knives relative to their carrier is intended to compensate for such irregularities, i.e., it should enable each and every knife to move its cutting edge to an optimum position with reference to the peripheral surface of the anvil irrespective of eventual deviations of the position(s) of one or more knives (relative to the carrier) from an optimum position. The aforementioned movability of knives relative to the carrier further reduces the likelihood of excessive and rapid wear and/or the making of unclean or incomplete cuts.

The just discussed severing apparatus exhibit certain serious drawbacks. Thus, a tiltable knife is likely to strike against the running web (and hence against the peripheral surface of the anvil) first with a small portion of its cutting edge to thereupon change its inclination relative to the carrier so that, ultimately, the entire cutting edge is parallel to the axis of the anvil. Such tilting of knives during each and every cut is the cause of readily detectable noise which is increased due to the fact that the knives are normally mounted with some freedom of radial movement relative to the carrier. Thus, each knife repeatedly strikes against the fulcrum in the respective groove or against the surface in the deepmost portion of the respective groove with attendant generation of additional noise. When the knives move beyond the nip between the carrier and the anvil, they are lifted off the just mentioned surfaces or fulcra by centrifugal force to be again propelled against the carrier or against the respective fulcra during the making of the next-following cuts.

Additional noise is generated as a result of shifting of the carrier and anvil radially of their axes and away from each other whenever a knife strikes against the peripheral surface of the anvil. This is due to the aforementioned mounting of the carrier in such a way that the radius of the cutting circle exceeds the distance between the axis of the carrier and the peripheral surface of the anvil. Repeated movements of the carrier and/or anvil radially of and away from each other cause the development of play between the bearings and the shafts for such parts and/or play in the bearings themselves with attendant generation of additional pronounced noise.

The generation of noise is particularly undesirable in modern high-speed machines, such as recent types of filter tipping machines which can turn out inordinately large numbers of cigarettes, cigars or cigarillos per unit of time. The noise is compounded due to the fact that numerous filter tipping machines (and/or other machines, such as cigarette packing machines, which are equipped with means for subdividing running webs of paper, cardboard, foil or the like into discrete sections or blanks) are normally installed in one and the same hall in a tobacco processing plant.

OBJECTS AND SUMMARY OF THE INVENTION

An object of the invention is to provide a novel and improved apparatus for severing running webs of paper or the like in such a way that each knife can make a clean cut but that the generation of noise is a fraction of that which develops in connection with the utilization of conventional apparatus.

Another object of the invention is to provide a novel mounting for the knife or knives in a severing apparatus which is used to convert a running web into a series of discrete uniting bands, blanks or the like.

A further object of the invention is to provide a novel and improved mounting for the carrier and/or anvil of a severing apparatus for running webs of paper, foil or the like.

An additional object of the invention is to provide the severing apparatus with novel and improved means for greatly reducing noise as a result of impingement of one or more knives against the peripheral surface of the anvil.

Another object of the invention is to provide a machine, such as a filter tipping machine, which embodies the improved apparatus.

An additional object of the invention is to provide a severing apparatus wherein the wear upon the carrier, upon the knife or knives and/or upon the anvil is less pronounced than in heretofore known severing apparatus.

A further object of the invention is to provide a severing apparatus wherein the noise is reduced in a number of ways so that it amounts to a small fraction of the noise which is unavoidable when a running web is severed in a conventional apparatus.

An additional object of the invention is to provide a severing apparatus wherein the position of each knife relative to its carrier must be adjusted only once and thereupon remains unchanged or substantially unchanged as long as the knife or knives continue to form clean and uniform cuts.

A further object of the invention is to provide a severing apparatus wherein the rebounding of the knife or knives against the carrier is prevented in a simple and inexpensive way.

The invention is embodied in an apparatus for repeatedly severing a running web, particularly a web of tipping paper in a filter tipping machine. The apparatus comprises a back support or anvil which is rotatable about a first axis and has a cylindrical peripheral surface a portion of which is continuously contacted by the running web, a carrier (e.g., a cylindrical drum) rotatable about a second axis which is at least substantially coplanar with and preferably at least substantially parallel to the first axis, at least one knife which is movably mounted in the carrier, which is disposed in a plane extending substantially radially of the second axis, and which has an elongated cutting edge cooperating with the aforementioned portion of the peripheral surface of the anvil to sever the web once during each revolution of the carrier, and means for yieldably biasing the knife in a direction which is at least substantially parallel to the second axis. The biasing means is preferably designed to bias the knife with a force which suffices to hold the knife against movement relative to the carrier excepting when the movement of the knife is necessary (e.g., during the making of the first cut) to ensure that the entire cutting edge of the knife cooperates with the peripheral surface of the anvil in order to sever the running web.

The mounting of the knife is preferably such that the latter is tiltable with reference to the carrier about a third axis which is substantially normal to and spaced apart from the second axis and is disposed substantially midway between the ends of the cutting edge. To this end, the knife can be pivotably mounted on a suitable fulcrum which is inserted into an axially parallel peripheral groove of the carrier.

The knife can constitute or may include an elongated blade which is provided with the aforementioned cutting edge, and the biasing means can be interposed between at least one end portion of the elongated knife and the carrier. To this end, the carrier can be provided with integral or removable sections which are outwardly adjacent to the end portions of the knife (as considered in the axial direction of the carrier), and the biasing means can include resilient means (e.g., coil springs or the like) interposed between at least one of the sections and the respective end portion of the knife.

The arrangement may be such that the resilient means react against the sections of the carrier and bear against the neighboring end faces or edge faces of the respective end portions of the knife. Alternatively, the resilient means can react against the end portions of the knife and bear against the neighboring edge faces or end faces of the respective sections. For example, the end faces of the end portions of the knife can be provided with sockets in the form of blind bores, and the resilient means can comprise prestressed springs which extend into the sockets and bear directly or indirectly (e.g., through the medium of suitable sliding blocks made of metal, leather or a combination of such substances) against the respective sections of the carrier. Alternatively, spring-biased (prestressed) slide blocks can be mounted in the sections of the carrier to bear against the adjacent end faces of the corresponding end portions of the knife.

That end face or edge face against which a slide block bears to generate friction which prevents uncontrolled movements of the knife relative to the carrier (e.g., those movements which would be caused by centrifugal force and/or gravity) is preferably inclined so as to make an oblique angle with the axis of the carrier. Thus, the carrier and the biasing means can cooperate to hold the knife against movement radially of and away from the carrier under the action of centrifugal force and/or gravity; to this end, the biasing means can be wedged against the aforementioned inclined edge face or edge faces to offer a progressively increasing resistance to radially outward movement of the respective end portions of the knife.

The apparatus is mounted in a suitable housing, e.g., in the housing or frame of the filter tipping machine. Such housing can include spaced-apart first and second portions and the anvil and carrier are then disposed between the two portions of the housing. The arrangement is preferably such that the anvil includes a first shaft which defines the first axis and the carrier includes a second shaft which defines the second axis. These shafts have first end portions which are mounted in the first portion of the housing and second end portions which are mounted in the second portion of the housing. The apparatus then preferably further comprises means, e.g., one or more coil springs, for yieldably urging at least one of the shafts axially in a direction from one of the housing portions toward the other housing portion. This further reduces the likelihood of generation of excessive noise when the apparatus is in use, i.e., the biasing means prevent the knife from wobbling relative to the carrier, and the urging means prevent the respective shaft from wobbling relative to the housing. The urging means can comprise one or more resilient elements which bear against a selected portion of an antifriction bearing for the end portion of the respective shaft. Such antifriction bearing is mounted in the respective portion of the housing and can comprise inner and outer races with antifriction rolling elements therebetween. The resilient element or elements can bear against the outer race so as to tend to shift such outer race axially relative to the inner race so that the stresses which prevent wobbling of the one shaft in the housing are transmitted through the rolling elements.

Still further, the apparatus can comprise means for preventing radial wobbling of the shafts in the respective housing portions. To this end, the end portions of the shafts can be mounted in suitable bearing units each of which has a first annular part for the respective end portion of the first shaft and a second annular part for the respective end portion of the second shaft. The first and second annular parts are acted upon by suitable prestressed resilient means, e.g., by dished springs which are installed between the respective first and second parts and whose bias or initial stress can be adjusted by screws or the like. The just discussed feature of preventing radial wobbling of the shafts can be resorted to independently of, but preferably in addition to, the aforediscussed features of preventing wobbling of the knife relative to the carrier and/or of preventing axial movements of the shafts relative to the housing.

The novel features which are considered as characteristic of the invention are set forth in particular in the appended claims. The improved severing apparatus itself, however, both as to its construction and its mode of operation, together with additional features and advantages thereof, will be best understood upon perusal of the following detailed description of certain specific embodiments with reference to the accompanying drawings.

DESCRIPTION OF THE PREFERRED EMBODIMENTS

Figure 1:
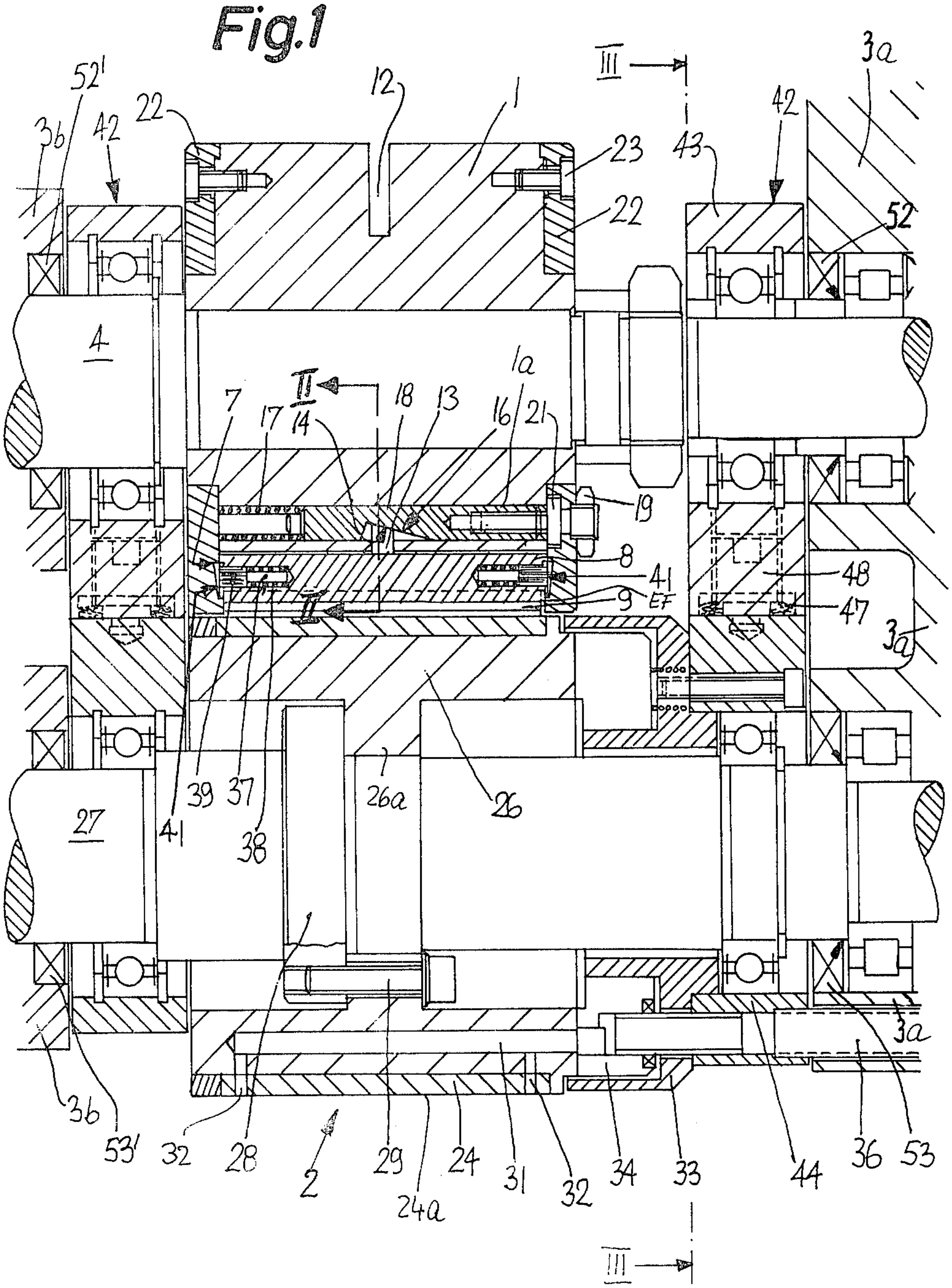
FIG. 1 is a sectional view of a severing apparatus which embodies one form of the invention, the section being taken in a plane which includes the axes about which the anvil and the carrier rotate.
Figure 2:
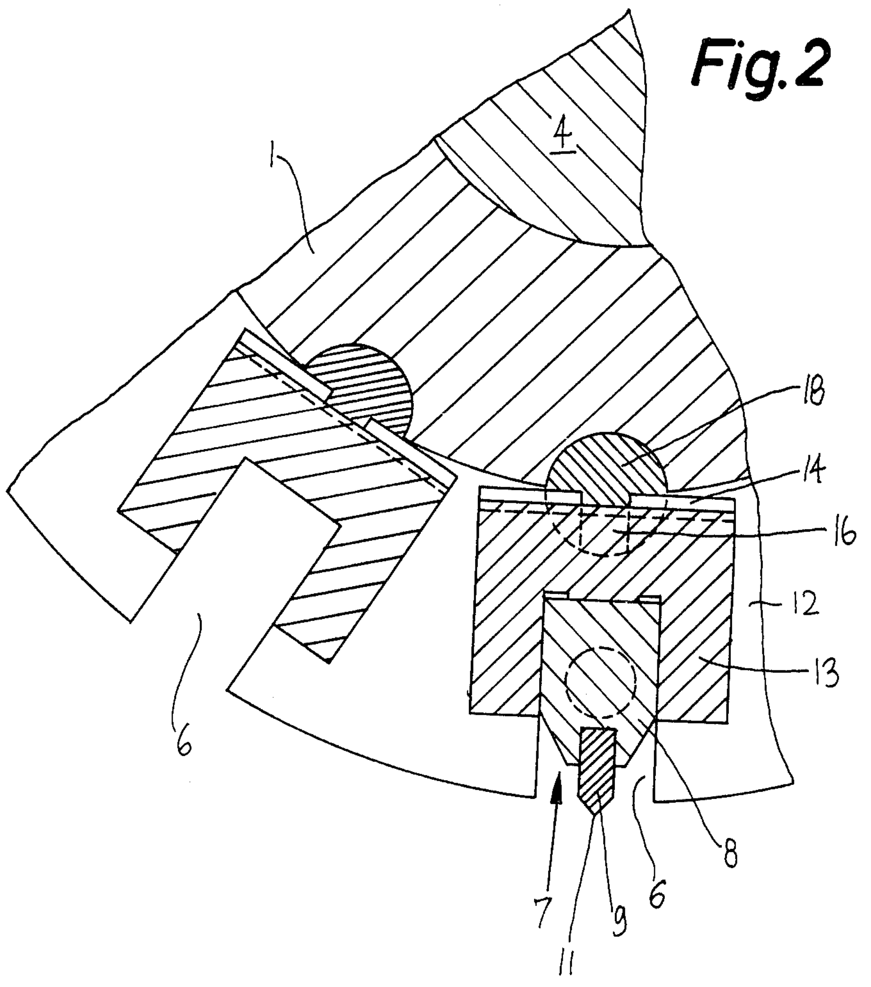
FIG. 2 is an enlarged fragmentary transverse sectional view of the carrier and one of the knives, substantially as seen in the direction of arrows from the line II—II of FIG. 1.

FIG. 1 shows a severing apparatus which can be used in a filter tipping machine, such as the machine shown in FIG. 2 of the aforementioned patent to Reuland et al. The apparatus comprises a housing or frame including two spaced-apart portions 3*a* and 3*b*, a rotary knife carrier 1 having a horizontal shaft 4 whose end portions are rotatable in the respective housing portions 3*a*, 3*b*, and a rotary cylindrical anvil (suction drum) 2 whose shaft 27 is also rotatable in the housing portions 3*a* and 3*b*. The shafts 4 and 27 are driven in synchronism by the main prime mover (not shown) of the filter tipping machine. It will be noted that the carrier 1 and anvil 2 are disposed between the housing portions 3*a* and 3*b*, i.e., that each of the shafts 4, 27 has a first end portion extending beyond the left-hand end of the respective part 1, 2 and a second end portion extending beyond the right-hand end of the respective part 1, 2, as viewed in FIG. 1.

The peripheral surface of the substantially cylindrical drum-shaped carrier 1 is formed with a set of equidistant axially parallel radially extending grooves or recesses 6 (see FIG. 2) each of which movably receives a discrete knife 7. For the sake of simplicity, FIG. 2 merely shows a single knife 7; however, it will be understood that each groove 6 receives a discrete knife. The number of knives 7 can be reduced to one without departing from the spirit of the invention. Each knife 7 comprises an elongated holder 8 which is tiltable in the respective groove 6 about an axis normal to and spaced apart from the axis of the shaft 4, and an elongated blade 9 which is preferably removably installed in the respective holder 8 and has an elongated cutting edge 11 extending in substantial parallelism with the axis of the shaft 4.

The mounting of each knife 7 in the respective groove 6 is such that the holders 8 are preferably tiltable about (the aforementioned) axes which are disposed substantially midway between the ends of the respective cutting edges 11. To this end, the carrier 1 is formed with a circumferentially extending groove 12 which intersects the recesses or grooves 6 and receives several discrete fulcra or supports 13, one for each of the knives 7. Each fulcrum 13 has an inclined cam face 14 which faces the axis of the shaft 4 and cooperates with a complementary cam face 16 which is provided on a wedge-like adjusting element 18. Each adjusting element 18 is shiftable in an axially parallel bore 1*a* of the carrier 1 and is biased by a coil spring 17 so as to urge the associated adjusting element 18 in a direction to the right, as viewed in FIG. 1, namely, in a direction to allow the respective fulcrum 13 to penetrate deeper into the groove 12. The axial position of each adjusting element 18 can be changed by a discrete screw 19 which cooperates with a lock nut 21, both shown in FIG. 1. The screws 19 are rotatably mounted in the carrier 1 and their external threads mate with internal threads of the respective adjusting elements 18. Once the axial position of an adjusting element 18 has been selected, the corresponding screw 19 is fixed against uncontrolled angular movement by the associated nut 21 which then bears against the right-hand end face of the right-hand ring 22 shown in FIG. 1 and constituting a detachable end portion or section of the carrier 1. The springs 17 prevent wobbling of the adjusting elements 18 in their bores 1a and thus ensure that the fulcra 13 are invariably held in selected positions, as considered in the radial direction of the carrier 1. The central portions of the knives 7 are moved radially outwardly, i.e., away from the shaft 4, if the corresponding screws 19 are rotated to move the cooperating adjusting elements 18 in a direction to the left, as viewed in FIG. 1. The knives 7 can move in the opposite direction (toward the shaft 4) when the adjusting elements 18 are caused to move in a direction to the right, as viewed in FIG. 1.

The aforementioned right-hand ring 22 constitutes one of two removable end portions or sections of the carrier 1. Each of the rings 22 is separably secured to the main body portion of the carrier 1 by screws 23 or other suitable fastener means.

The anvil 2 of the severing apparatus comprises a hollow cylindrical core 26 which is mounted on the shaft 27 and is surrounded by a hollow cylindrical sleeve or shell 24. The core 26 has an internal annular collar 26a which is fixedly secured to an adjacent annular flange 28 of the shaft 27 by bolts 29 or analogous fasteners. The shaft 27 is driven in synchronism with the shaft 4. The cylindrical peripheral surface 24a of the shell 24 is contacted by the web of tipping paper which is not specifically shown in the drawing. Such web overlies a certain portion of and is guided by the peripheral surface 24a while advancing from a paster which coats one side of the web with a suitable adhesive. Reference may be had to the description of FIG. 2 in the aforementioned patent to Reuland et al. The web is advanced into the nip of the shell 24 and cylindrical carrier 1, and its leader is severed by successive cutting edges 11 when the shafts 4 and 27 are driven by the prime mover of the filter tipping machine.

In order to ensure that the web will adhere to a predetermined portion of the peripheral surface 24a in each angular position of the shell 24, the anvil 2 is provided with a pneumatic system which attracts the uncoated side of the web to the adjacent portion of the peripheral surface 24a, namely, to that portion which extends to both sides of the nip between the shell 24 and the carrier 1. To this end, the core 26 is formed with axially parallel channels 31 which are equidistant from one another, as considered in the circumferential direction of the shell 24, and each of which communicates with a row of discrete suction ports 32 in the shell 24. FIG. 1 merely shows a single channel 31 and a row consisting of only two axially spaced suction ports 32. The housing section 3a supports an annular valve plate 33 which is held against rotation with and is biased against the right-hand end face of the core 26, as viewed in FIG. 1. The valve plate 33 is formed with an arcuate groove 34 which communicates with the neighboring channels 31 and is further connected to a suitable suction generating device by a conduit 36 mounted in the housing section 3b. When the shaft 27 drives the core 26, successive channels 31 move beyond and out of register with and successive channels 31 also move toward and into register with the groove 34, i.e., a certain number of channels 31 (and the corresponding rows of suction ports 32) invariably communicate with the groove 34 and hence with the intake of the suction generating device to thus ensure that the running web of tipping paper adheres to the surface 24a along a predetermined arc.

When the severing apparatus is in use, the shafts 4 and 27 respectively drive the carrier 2 and shell 24 while the web advances through the nip of the parts 1 and 24. Therefore, successive knives 7 on the carrier 1 sever the web all the way from the one to the other edge of the web to convert the leader of the web into a succession of discrete uniting bands of predetermined length, namely, a length which suffices to convert each uniting band into a tube capable of adequately connecting a filter plug with one or two coaxial plain cigarettes, cigars or cigarillos of unit length or multiple unit length. As mentioned above, the knives 7 are tiltable about axes which are defined by the respective fulcra 13 and extend at right angles to and are spaced apart from the axis of the shaft 4. As also mentioned above, the fulcra 13 are disposed substantially midway between the ends of the respective cutting edges 11 so that each of the holders 8 can be said to resemble the transverse bar of a balance.

In accordance with a feature of the invention, the knives 7 are biased by yieldable biasing means acting or having components acting in substantial parallelism with the common axis of the carrier 1 and shaft 4. Such bias is applied to at least one but can be applied to both end faces of each knife 7, and more specifically to both end faces of each holder 8, so as to prevent free tilting of the holders 8 about the respective fulcra 13 but to permit each cutting edge 11 to assume an optimum position or orientation with reference to the peripheral surface 24a of the shell 24. In the embodiment of FIGS. 1 and 2, the end faces EF of the holders 8 are formed with axially parallel blind bores or sockets 37 each of which accommodates a prestressed coil spring 38 or another suitable resilient element and a portion of a slide block 39 which extends from the respective bore or socket 37 to bear against the adjacent end face of the respective ring 22, i.e., of the respective (detachable) section of the carrier 1. The slide blocks 39 can consist of a variety of friction generating materials; in the embodiment of FIGS. 1 and 2, the blocks 39 are assumed to consist of or to constitute plugs made of convoluted sheets of leather. Each such block 39 is biased by the respective spring 38 with a requisite force so as to enable the corresponding holder 8 to pivot with respect to its fulcrum 13 to the extent which is necessary to move the respective cutting edge 11 into exact parallelism with the shell 24, i.e., to ensure that the cutting edges 11 of successive blades 9 will be capable of severing the running web all the way from the one to the other edge of the web without any pivoting of such cutting edges and blades except when the respective knives 7 make the first of a long series of successive cuts.

FIG. 1 further shows that the inner end faces of the rings 22 are formed with portions 41 which make oblique angles with the axis of the shaft 4 and are inclined in such a way that they oppose radially outward movement of the respective blocks 39. Thus, the distance between the edge faces or end face portions 41 for two coaxial blocks 39 (at the opposite ends of a holder 8) decreases in a direction as considered radially of and away from the shaft 4. In other words, when the carrier 1 rotates and the holders 8 tend to move radially outwardly and away from the respective fulcra 13 under the action of centrifugal force, the springs 38 cooperate with the blocks 39 and these blocks cooperate with the respective surface portions 41 to prevent any or any appreciable radially outward movement of the holders 8 so that the radius of the cylinder which is described by the cutting edges 11 of the blades 9 when the carrier 1 rotates remains unchanged. The bias of prestressed coil springs 38 can be readily selected or adjusted in such a way that they offer the necessary resistance to radially outward movement of the respective blades 9 but still permit each blade to change its inclination, i.e., to pivot relative to the associated fulcrum 13 (if necessary), during the first revolution of the carrier 1, namely, during that revolution when the angular positions of the knives 7 in their respective grooves 6 are to be changed (if necessary) in order to ensure the making of clean cuts with a minimum of noise and with a minimum of wear upon the carrier 1, blades 9 and shell 24. The selection of a suitable friction generating material for the blocks 39, or at least for those portions of the blocks 39 which contact the rings 22, also contributes to secure retention of knives 7 in the initially determined positions, i.e., in such positions that the entire cutting edge 11 of each blade 9 barely contacts the peripheral surface 24*a* during travel of the respective knife along the nip of the parts 1 and 24.

A pronounced reduction of noise is attributable to the feature that the knives 7 are not free to pivot relative to the associated fulcra 13 as well as to the feature that the knives 7 are not free to move their blades 8 radially and away from the respective fulcra. Pivoting of knives 7 on the respective fulcra 13 could cause the generation of pronounced noise, and such noise would be compounded by repeated impact of the holders 8 against the adjacent fulcra 13 if the knives 7 were free to pivot in their grooves 6 and if the knives were free to move radially outwardly immediately after advancing beyond the nip of the parts 1 and 24. In the novel severing apparatus, the extent of movement of knives 7 away from the respective fulcra 13 between successive cutting operations is minimal or zero.

Figure 3:
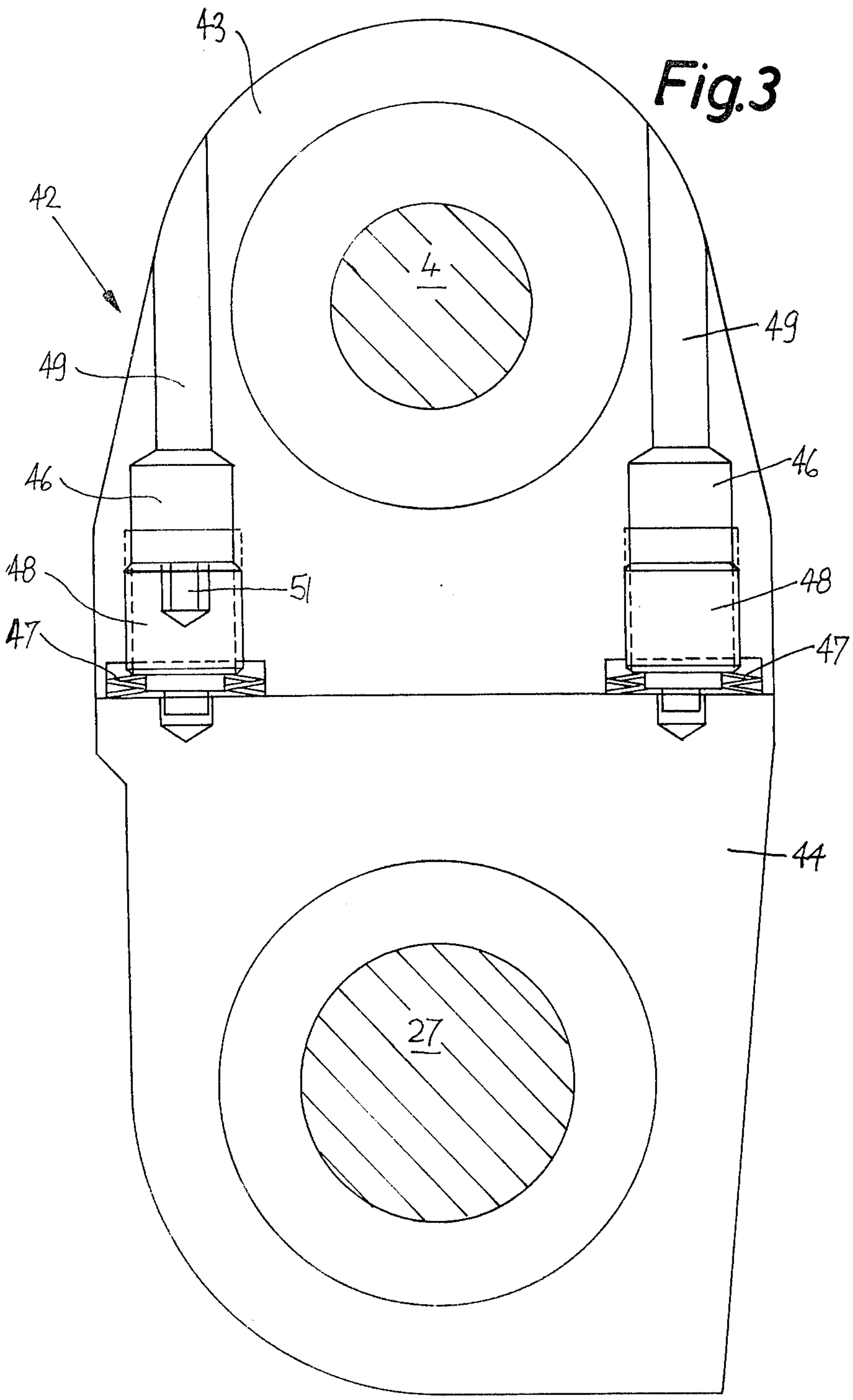
FIG. 3 is a sectional view as seen in the direction of arrows from the line III—III of FIG. 1.

The generation of noise can be reduced still further by reducing the play in and for the bearing units 42 which mount the end portions of the shafts 4 and 27. Such bearing units can be seen in FIGS. 1 and 3 and resemble, to a certain extent, those disclosed in commonly owned German Offenlegungsschrift No. 1,805,074. As shown in FIG. 1, the left-hand end portions of the shafts 4 and 27 are mounted in a first composite bearing or bearing unit 42, and the right-hand end portions of these shafts are mounted in a similar second composite bearing or bearing unit 42. Each of the bearing units 42 comprises two discrete annular parts 43, 44 which respectively surround the end portions of the shafts 4 and 27 (note particularly FIG. 3) and are braced against each other (namely, they tend to move away from each other) by resilient elements in the form of dished springs 47. Each of the annular parts 43 is formed with two parallel bores 46 which flank the respective end portion of the shaft 4 and whose inner end portions receive the dished springs 47. The bias of the dished springs 47 can be regulated by adjusting members 48 in the form of relatively short externally threaded cylinders meshing with threads surrounding the respective bores 46. The upper end faces of the cylinders 48 have centrally located hexagonal sockets 51 (only one shown in FIG. 3) each of which can receive the working end of a suitable wrench (not shown). Such wrench can be inserted through smaller-diameter bores 49 which are accessible at the upper sides of the annular parts 43 and communicate with the respective bores 46 at a level above the cylinders 48.

The dished springs 47 are stressed by the respective cylinders 48 so that they tend to move the end portions of the shaft 4 and the respective end portions of the shaft 27 away from each other and to thus prevent wobbling of the end portions of the shafts 4 and 27 in their respective antifriction bearings 52, 52' and 53, 53'. These antifriction (ball, roller or needle) bearings are mounted in the respective housing portions 3*a* and 3*b*. In other words, the bearing units 42 including the annular parts 43, 44 and the dished springs 47 eliminate axial and/or radial play of shafts 4, 27 in their antifriction bearings, i.e., the play of end portions of the shafts in the housing portions 3*a* and 3*b*. The bearing units 42 render it even more possible and likely that the cutting edges 11 of the blades 9 will barely touch the peripheral surface 24*a* of the shell 24 upon completion of cuts across the entire running web of tipping paper or the like. Owing to such mounting of the shafts 4, 27, carrier 1, anvil 2 and knives 7, the force with which a blade 9 strikes against the anvil 2 during severing of the web is but a small fraction of the force of impact in a conventional severing apparatus wherein the knives are not subjected to axially oriented stresses and the end portions of the shafts for the carrier and anvil are free to wobble with reference to the housing. A pronounced reduction of the force of impact (and, in fact, any reduction of such force) evidently results in a reduction of noise which is generated when the knives 7 sever the running web.

Figure 4:
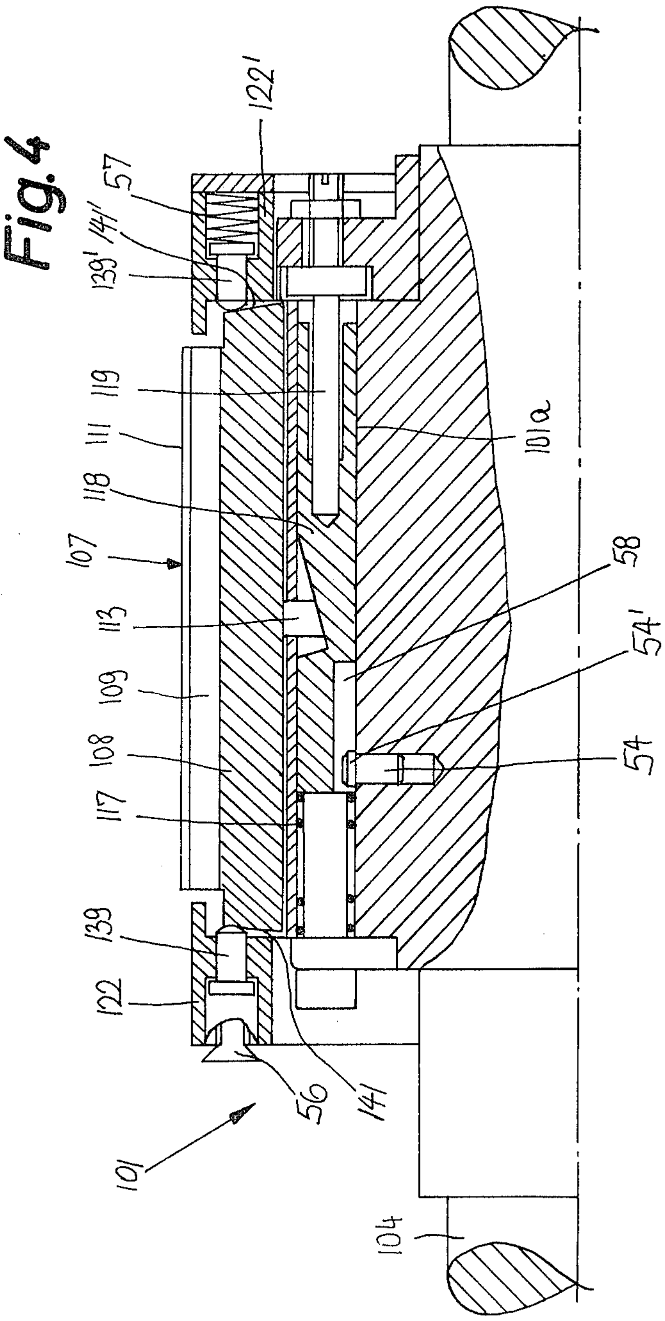
FIG. 4 is a fragmentary axial sectional view of the carrier and one knife in a modified severing apparatus.

FIG. 4 shows a portion of a modified carrier 101, a modified knife 107, and modified means for biasing the knife 107 in substantial parallelism with the axis of the carrier 101. All such parts which are identical with or clearly analogous to those shown in FIG. 1 or 2 are denoted by similar reference characters plus 100.

The holder 108 of the illustrated knife 107 is pivotable on a fulcrum 113 which is adjustable by a wedge-like adjusting element 118 substantially in the same way as described in connection with FIG. 1. The fulcrum 113 is disposed substantially midway between the ends of the holder 108. When the adjusting element 118 is moved in parallelism with the axis of the carrier 101, the fulcrum 113 is moved radially outwardly and away from the shaft 104 or is free to move radially inwardly, i.e., closer to the axis of rotation of the carrier 101. Wobbling of adjusting element 118 in its bore 101*a* is prevented by a prestressed coil spring 117 which reacts against the carrier 101 and bears against the left-hand end face of the element 118, as viewed in FIG. 4. The adjusting element 118 is held against rotation in its bore 101*a* by a screw 54 which is threaded into the carrier 101 and whose head 54' extends into a longitudinal slot 58 machined into or otherwise formed in the adjacent portion of the element 118.

The knife 107 is disposed between two rings 122, 122' which can be said to constitute detachable end portions or sections of the carrier 101 and are adjacent to the respective end portions of the holder 108 for the blade 109. The end faces or edge faces 141 and 141' of the holder 108 slope toward each other, as considered in a direction radially of and away from the shaft 104, and are respectively engaged by metallic slide blocks 139, 139' forming part of means for yieldably biasing the knife 107 in a direction which is at least substantially parallel to the axis of rotation of the carrier 101. One of the two illustrated biasing means further comprises a prestressed coil spring 57 which reacts against the respective ring 122' and urges the associated block 139' against the adjacent inclined end face or edge face 141'. Each of the end faces 141, 141' makes an oblique angle with the axis of the shaft 104.

The left-hand block 139 is held against movement in a direction to the left, as viewed in FIG. 4, by an adjusting screw 56 which meshes with the respective ring 122. Each of the blocks 139, 139' resembles a short screw whose shank abuts against the respective end face 141, 141' and whose head is disposed in a chamber provided therefor in the respective ring 122, 122'. Since the end faces 141 and 141' slope in the aforedescribed manner, it can be said that the length of the knife 107 (and more particularly the length of its holder 108) decreases as considered in a direction radially of and away from the shaft 104. This, combined with the retaining action of the shanks of slide blocks 139, 139', prevents the knife 107 from leaving its groove in the carrier 101 under the action of centrifugal force when the shaft 104 is driven, i.e., when the severing apparatus is in use.

The bias of the spring 57 is selected in such a way that the orientation of the holder 108 can be changed during the making of the first of a long series of cuts but that the position of the holder 108 relative to the carrier 101 (and relative to the anvil, not shown) remains unchanged. This again prevents repeated impact of the holder 108 against the fulcrum 113 and tilting of the holder 108 relative to the fulcrum 113 with attendant pronounced reduction of noise. It will be noted that the inclined end faces or surfaces can be provided on the holder or holders (FIG. 4) or on the adjacent sections (FIGS. 1–3) of the carrier.

Figure 5:
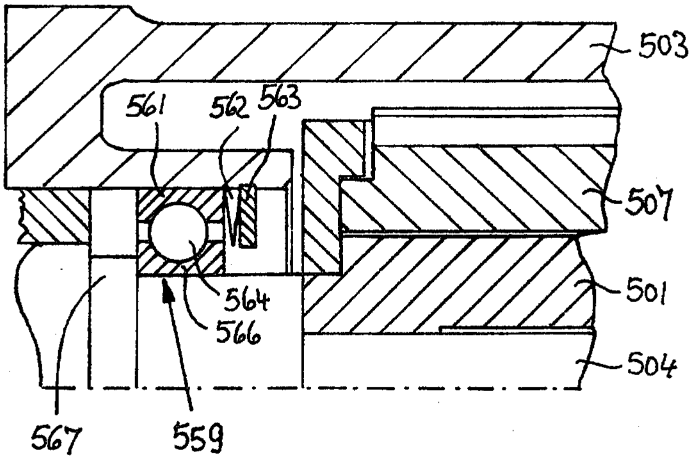
FIG. 5 is a fragmentary axial sectional view of the housing, carrier and one knife in a third apparatus wherein the shafts for the carrier and anvil are held against wobbling in the axial direction.

FIG. 5 illustrates a further embodiment of the invention. There is shown a portion of a drum-shaped carrier 501 and a portion of a single knife 507 or of one of a set of equidistant knives. The shaft 504 of the carrier 501 is rotatable in a housing or frame 503 and each knife 507 can be mounted in the carrier 501 in a manner as described in connection with FIGS. 1–3 or FIG. 4.

The illustrated end portion of the shaft 504 is surrounded by an antifriction bearing 559 having an annular outer race 561, an annular inner race 566, and a set of antifriction rolling elements 564 (e.g., balls) between the two races. In accordance with a feature of the invention, the outer race 561 is stressed or biased in the axial direction of the shaft 504 by a prestressed coil spring 562 (by a set of such springs or by a set of prestressed dished springs) which reacts against a split retaining ring 563 recessed into the housing 503 and bears against the right-hand end face of the race 561, as viewed in FIG. 5. Thus, the outer race 561 tends to move in a direction to the left, as viewed in FIG. 5, and thereby stresses the rolling elements 564 which, in turn, stress the inner race 566. However, and since the inner race 566 abuts against a flange 567 of the shaft 504, the shaft 504 is held against wobbling, as considered in the axial direction of the carrier 501. This, too, contributes to a reduction of noise, especially when combined with the aforediscussed axial stressing of the knives and the provision of special bearing units (42) for the shafts of the carrier and anvil. Moreover, the biased or stressed antifriction bearing 559 contributes to smooth running of the carrier 501.

The manner in which the other end portion of the shaft 504 is mounted in its antifriction bearing (which, in turn, is mounted in the housing or frame 503) can be the same as shown in FIG. 5 for the left-hand end portion of the shaft 504. Similar stressing means (not shown) can be provided for the shaft of the anvil (not shown) which cooperates with the carrier 501 and knife 507 of FIG. 5.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for repeatedly severing a running web, particularly a web of tipping paper in a filter tipping machine, comprising an anvil rotatable about a first axis and having a hard cylindrical peripheral surface a portion of which is contacted by the running web; a carrier rotatable about a second axis which is at least substantially coplanar with said first axis; at least one knife movably mounted in said carrier and disposed in a plane extending substantially radially of said second axis, said knife having an elongated cutting edge arranged to cooperate with said portion of said peripheral surface to sever the web once during each revolution of said carrier and said knife being tiltable with reference to said carrier about a third axis which is substantially normal to and spaced apart from said second axis; and means for yieldably biasing said knife in a direction which is substantially parallel to said second axis so as to hold said cutting edge in an orientation and at a distance from said second axis as determined by said portion of the peripheral surface of said anvil in response to first engagement between such cutting edge and said portion of said peripheral surface, said biasing means comprising a portion movable in said direction.

2. The apparatus of claim 1, wherein said second axis is at least substantially parallel to said first axis.

3. The apparatus of claim 1, wherein said knife has first and second end portions and said biasing means is interposed between at least one of said end portions and said carrier.

4. The apparatus of claim 1, wherein said carrier has first and second sections adjacent to the respective end portions of said knife, said biasing means including resilient means interposed between at least one of said sections and the respective end portion of said knife.

5. The apparatus of claim 4, wherein said end portions have end faces and said resilient means reacts against said one section and bears against the end face of the corresponding end portion.

6. The apparatus of claim 1, wherein said knife has end portions including end faces having sockets and said carrier has sections adjacent to such end faces, said biasing means including prestressed resilient means bearing against said sections and extending into the respective sockets.

7. The apparatus of claim 6, wherein said sockets are bores.

8. The apparatus of claim 1, wherein said knife has first and second end portions and said carrier has first and second sections adjacent to the respective end portions, said biasing means comprising a spring-biased slide block mounted in one of said sections and bearing against the respective end portion.

9. The apparatus of claim 1, wherein said knife has first and second end portions and said carrier has first and second sections adjacent to the respective end portions, said biasing means comprising spring-biased slide blocks mounted in said end portions and bearing against the respective sections.

10. The apparatus of claim 1, wherein said knife has an end portion and said carrier has a portion adjacent to said end portion, said biasing means including a spring-biased slide block mounted in one of said portions and bearing against the other of said portions, at least that part of said slide block which contacts said other portion consisting of leather.

11. The apparatus of claim 1, wherein said knife has an end face and said carrier has a face adjacent to said end face, said biasing means including resilient means interposed between said carrier and said knife and bearing against one of said faces, said one face making an oblique angle with said second axis.

12. The apparatus of claim 11, wherein the inclination of said one face is such that said carrier and said resilient means cooperate to hold said knife against movement radially of and away from said second axis under the action of centrifugal force.

13. The apparatus of claim 1, further comprising a housing having spaced apart first and second portions, said carrier and said anvil being disposed between said portions and respectively having first and second shafts defining the respective axes and each having first and second end portions mounted in the respective portions of said housing, and further comprising means for yieldably urging at least one of said shafts axially in a direction from one portion toward the other portion of said housing.

14. The apparatus of claim 13, wherein said shafts are at least substantially parallel to each other.

15. The apparatus of claim 13, wherein said urging means comprises spring means.

16. The apparatus of claim 13, further comprising an antifriction bearing for an end portion of said one shaft, said bearing being mounted in the respective portion of said housing and said urging means comprising means for stressing said bearing to thereby urge the respective shaft axially.

17. The apparatus of claim 1, further comprising a housing having spaced apart first and second portions, said anvil and said carrier being disposed between said portions and each having first and second end portions adjacent to the respective portions of said housing, and further comprising a first bearing unit for the first end portions and a second bearing unit for the second end portions of said anvil and said carrier, said bearing units being installed in the respective portions of said housing and each having a first part for the respective end portion of said carrier, a second part for the respective end portion of said anvil and prestressed resilient means interposed between said first and second parts.

18. The apparatus of claim 17, wherein said resilient means include dished springs.

19. The apparatus of claim 17, further comprising means for adjusting the bias of said resilient means.

* * * * *